United States Patent
Wendling et al.

(10) Patent No.: US 8,402,521 B2
(45) Date of Patent: Mar. 19, 2013

(54) SYSTEMS AND METHODS FOR DUAL READER EMULATION

(75) Inventors: Jean-Hugues Wendling, Denver, CO (US); John D. Menzel, Highlands Ranch, CO (US); Michael T. Conlin, Superior, CO (US)

(73) Assignee: Xceedid, Golden, CO (US)

( * ) Notice: Subject to any disclaimer, the term of this patent is extended or adjusted under 35 U.S.C. 154(b) by 2521 days.

(21) Appl. No.: 11/193,703

(22) Filed: Jul. 28, 2005

(65) Prior Publication Data

US 2006/0206927 A1 Sep. 14, 2006

Related U.S. Application Data

(63) Continuation-in-part of application No. 11/076,541, filed on Mar. 8, 2005.

(51) Int. Cl.
| | |
|---|---|
| *G06F 15/16* | (2006.01) |
| *G06F 13/00* | (2006.01) |
| *G06F 7/04* | (2006.01) |
| *G06F 17/30* | (2006.01) |

(52) U.S. Cl. ............... 726/6; 726/9; 726/18; 726/20; 713/185; 380/249

(58) Field of Classification Search ............ 726/5, 6, 726/9, 18, 20; 713/172, 185; 380/249
See application file for complete search history.

(56) References Cited

U.S. PATENT DOCUMENTS

| | | | |
|---|---|---|---|
| 5,041,826 A | 8/1991 | Milheiser | |
| 5,166,676 A | 11/1992 | Milheiser | |
| 5,235,326 A | 8/1993 | Beigel et al. | |
| 5,805,912 A | 9/1998 | Johnson et al. | |
| 5,822,548 A | 10/1998 | Story et al. | |
| 6,750,771 B1 | 6/2004 | Brand | |
| 6,888,459 B2 | 5/2005 | Stilp | |
| 6,963,267 B2 | 11/2005 | Murray | |
| 7,019,639 B2 | 3/2006 | Stilp | |
| 7,023,341 B2 | 4/2006 | Stilp | |
| 7,119,738 B2 | 10/2006 | Bridgelall et al. | |
| 7,268,687 B2 | 9/2007 | Egbert et al. | |
| 7,321,300 B2 | 1/2008 | Friedrich et al. | |
| 7,439,862 B2 | 10/2008 | Quan | |
| 2001/0045454 A1* | 11/2001 | Gangi | 235/380 |
| 2002/0147792 A1* | 10/2002 | Harrison et al. | 709/217 |
| 2003/0046541 A1 | 3/2003 | Gerdes et al. | |
| 2003/0048174 A1 | 3/2003 | Stevens et al. | |
| 2004/0215964 A1* | 10/2004 | Barlow et al. | 713/172 |
| 2006/0283958 A1* | 12/2006 | Osterweil | 235/492 |
| 2006/0290502 A1 | 12/2006 | Rawlings | |
| 2007/0008140 A1 | 1/2007 | Saarisolo et al. | |

(Continued)

FOREIGN PATENT DOCUMENTS

EP 1379052 7/2004

OTHER PUBLICATIONS

U.S. Appl. No. 11/076,090, filed Mar. 8, 2005, Conlin.

(Continued)

*Primary Examiner* — Michael Simitoski

(74) *Attorney, Agent, or Firm* — Michael Best Friedrich LLP

(57) ABSTRACT

Systems and methods for emulating credentials are disclosed. In some cases, the systems include an access credential reader and an access credential writer. The access credential reader is communicably coupled to the access credential writer. The access credential reader is operable to receive information from an access credential, and to transfer at least a portion of the information to the access credential writer. The access credential writer is operable to transfer at least the portion of the information to an emulation access credential.

7 Claims, 8 Drawing Sheets

U.S. PATENT DOCUMENTS

2007/0057057 A1 3/2007 Andresky
2007/0246546 A1 10/2007 Yoshida

OTHER PUBLICATIONS

U.S. Appl. No. 11/076,541, filed Mar. 8, 2005, Wendling.
"Skyetek RFID Readers", Data Sheet, Jul. 4, 2003, p. 1.
Hamilton, D.M., Amendment and Response in U.S. Appl. No. 11/076,090, filed Jan. 28, 2009; pp. 1-8.
Revak, C.A., Non-Final Office Action in U.S. Appl. No. 11/076,090, Mailed Oct. 27, 2008; pp. 1-10.
Hamilton, D.M., Amendment/Response and RCE in U.S. Appl. No. 11/076,541, filed Apr. 10, 2009; pp. 1-11.
Armouche, H., Advisory Action in U.S. Appl. No. 11/076,541, Mailed Feb. 24, 2009; pp. 1-4.
Hamilton, D.M., Supplemental Amendment and Response in U.S. Appl. No. 11/076,541, filed Feb. 12, 2009; pp. 1-7.
Armouche, H., Advisory Action in U.S. Appl. No. 11/076,541, Mailed Jan. 27, 2009; pp. 1-3.
Hamilton, D.M., Amendment and Response in U.S. Appl. No. 11/076,541, filed Jan. 9, 2009; pp. 1-11.
Armouche, H., Final Rejection in U.S. Appl. No. 11/076,541, Mailed Dec. 12, 2008; pp. 1-9.
Hamilton, D.M., Amendment and Response in U.S. Appl. No. 11/076,541, filed Dec. 1, 2008; pp. 1-10.
Armouche, H., Non-Final Rejection in U.S. Appl. No. 11/076,541, Mailed Sep. 8, 2008; pp. 1-9.

* cited by examiner

SYSTEMS AND METHODS FOR DUAL READER EMULATION

PRIORITY

This application is a continuation in part of U.S. patent application Ser. No. 11/076,541 entitled "Systems and Methods for Authorization Credential Emulation", and filed Mar. 8, 2005 by Wendling et al. The aforementioned application is incorporated herein by reference for all purposes.

BACKGROUND OF THE INVENTION

The present invention is related to transaction devices, and more particularly to systems and methods for emulating credentials for accessing transaction devices.

It has become common for a consumer to use a credit card to pay for a purchase using a credit card, or for an employee to gain access to a workspace by presenting an access card at an enabled access point. At least in part due to the extensive use of credit and access cards, it is not uncommon for a person to have five or more such cards on their person at any given time. This causes some degree of confusion and complexity to the person carrying and/or using the cards.

Further, the cards are of varied type and complexity. Thus, for example, a person may have a magnetic stripe card, a smart card, and a radio frequency card. Each of these cards serve different purposed and perform in different ways. Thus, while there are standards to which the various cards conform, there is not a single card type making it unlikely that a single ubiquitous card will be selected and supported.

Hence, for at least the aforementioned reasons, there exists a need in the art for advanced systems and methods for performing transactions.

BRIEF SUMMARY OF THE INVENTION

The present invention is related to transaction devices, and more particularly to systems and methods for emulating credentials for accessing transaction devices.

Various embodiments of the present invention provide systems for emulating access credentials. Such systems include an access credential reader and an access credential writer. The access credential reader is communicably coupled to the access credential writer. The access credential reader is operable to receive information from an access credential, and to transfer at least a portion of the information to the access credential writer. The access credential writer is operable to transfer at least the portion of the information to an emulation access credential. In some cases, the access credential reader is operable to communicate with an access control panel via a communication port. In such cases, the access credential reader may be communicably coupled with the access credential writer via the communication port.

The access credentials and/or emulation credentials may be, but are not limited to smart cards, magnetic stripe cards, cell phones, radio frequency cards, and personal digital assistants. In some cases, the credential being read by the access module is wirelessly coupled to the access module, while the credential being written by the access module is coupled to the access module via a wired interface. Various other embodiments of the present invention couple the credentials to the access control module using one or more interfaces that can include, but are not limited to, a magnetic stripe interface, a radio frequency interface, an optical interface, and a wired interface. In one particular instance of the embodiments, the access credential is a smart card and the emulation access credential being written is a cell phone. In this particular case, the smart card may be communicably coupled to the access credential reader via a wireless interface, and the cell phone may be communicably coupled to the access credential writer via a wired interface.

In some instances of the embodiments, the access credential reader and/or the access credential writer are capable of communicating at two or more frequencies. In such a case, the access credential being read may be read at one frequency, and the emulation access credential being written may be written at a second frequency. The information being read and written can be in the form of bit streams.

Other embodiments of the present invention provide methods for credential emulation. Such methods include providing two transaction devices that are communicably coupled. Information is received from a credential at one of the transaction devices. At least a portion of the information is transferred to the other transaction device. The other transaction device transfers at least the portion of the information to another credential. In some instances, the transaction device receiving the information from the credential is operable to communicate with an access control panel via a communication interface in such instances, the methods may further include terminating communication between the transaction device and the access control panel, and connecting the two transaction devices via the communication interface.

In such embodiments, the credentials can be, but are not limited to, smart cards, magnetic stripe cards, cell phones and personal digital assistants. Further, in some cases, the transaction device is operable at two or more frequencies. In such cases, one of the credentials may be accessed at a first carrier frequency, while the other credential is accessed at a second carrier frequency. Thus, for example, it may be that the credential being read is accessed at one carrier frequency, while the other credential is accessed at another carrier frequency.

Yet other embodiments of the present invention provide transaction credential emulation systems. Such systems include a transaction control module that is deployed at a transaction point, and operable to receive data from a first transaction credential. The systems further include an emulation module that is communicably coupled to the transaction control module. The emulation module is operable to receive at least a portion of the data from the first transaction credential, and to write at least the portion of the data from the first transaction credential to a second transaction credential This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
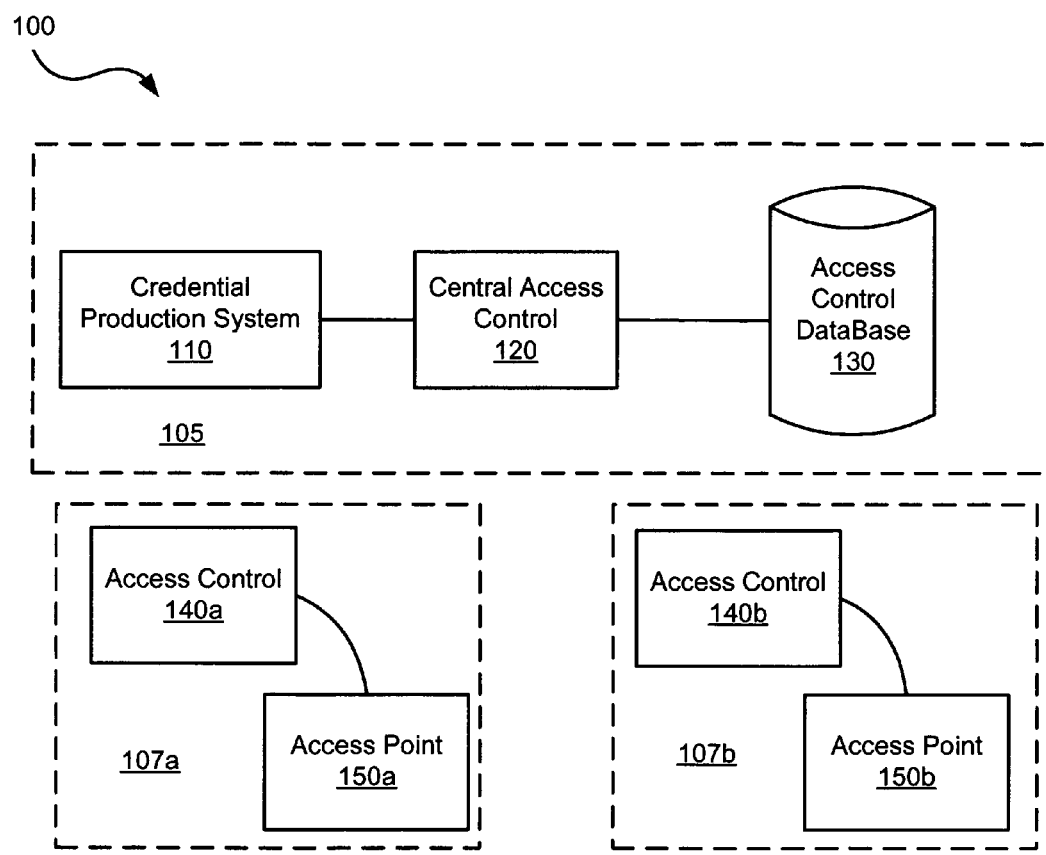
FIG. 1 depict access control and payment control systems known in the art.

The present invention is related to transaction devices, and more particularly to systems and methods for emulating credentials for accessing transaction devices.

Various embodiments of the present invention provide systems for emulating access credentials, payment credentials, and/or other credentials. As an example, some of the systems include an transaction device that is capable of controlling access via an access point based on information provided via an access credential. Further, the transaction device is capable of writing another access credential such that the other access credential becomes operable to access the access point. In some cases, the transaction device is deployed local to the access point allowing a user to emulate a credential at a location generally visited by the user in utilizing a credential. As used herein, the term "access point" refers to any location or device where physical access is provided. Thus, such an access point can be a door, a window, or the like.

As another example, some of the systems include a transaction device that is deployed at a point of sale and capable of effectuating payment via a payment credential. Further, the transaction device is capable of writing another access credential such that the other access credential becomes operable to effectuate payment. Based on the disclosure provided herein, one of ordinary skill in the art will recognize a variety of other transaction devices, and deployment locations that can be used in accordance with embodiments of the present invention.

As used herein, the term "credential" refers to any portable device that includes information useful in completing a transaction. Thus, for example, a credential may be a smart card with information allowing a user of the credential to access an access point. As another example, a credential may be a payment device capable of transferring payment information to a transaction device. Such credentials may be, but are not limited to, credit cards, debit cards, access control cards, smart cards, cellular telephones, personal digital assistants, and/or the like. Such credentials may be capable of communicating via a magnetic stripe, a radio frequency interface, a wired interface, an optical interface, and/or the like. Thus, as just one example, a credential being read by a transaction device is wirelessly coupled to the transaction device, while another credential being written by the transaction device is coupled to the transaction device via a wired interface. As another example, an credential being read by a transaction device may be a wireless smart card, and a credential being written by the transaction device may be a cellular phone. Based on the disclosure provided herein, one of ordinary skill in the art will recognize a variety credentials and mechanisms for facilitating communications between credentials and transaction devices.

For the purposes of this document, the term "access credential" is a credential that is capable of, but not limited to, providing access via an access point. Also, for the purposes of this document, the term "payment credential" is a credential that is capable of, but not limited to, providing payment capability. For the purposes of this document, the term "transaction credential" is any credential used in relation to a transaction. Such a transaction can be a payment transaction, an access transaction, or any other type of transaction. Based on the disclosure provided herein.

Also, as used herein, the term "transaction device" refers to any device or equipment that can receive authorization information from a credential and perform functions in relation to completing a transaction. Thus, for example, a transaction device may be, but is not limited to, a payment device such as a point of sale device, or an access control module or device operable to control access via an access point. Based on the disclosure provided herein, one of ordinary skill in the art will recognize a variety of other transaction devices that can be used in relation to one or more embodiments of the present invention.

Transaction devices in accordance with one or more embodiments of the present invention are capable of operating at multiple carrier frequencies. In such instances, it may be that one credential is read at one frequency, and that an emulated credential is written at another carrier frequency. Use of such multiple frequencies may allow for communication with a broader array of credentials.

Various of the transaction devices can be used to emulate credentials. As used herein, the term "emulate" is used in its broadest sense to indicate a process whereby one credential is made capable of interacting with one or more transaction devices. Thus, for example, in emulating a credential transaction information from one credential is provided to another credential.

Turning to FIG. 1A, a known access control system 100 is illustrated. System 100 includes a remote processing system 105 and local operation systems 107. Each of operation systems 107 include access control devices 140 physically coupled to respective access points 150. Access control devices 140 are electrically wired to an actuator of the associated access point 150. When access point 150 is to be opened, access control device 140 sends an electrical signal to operate the associated actuator.

Access information that allows for access via one or both of access control devices 140 is programmed into credentials by a central access control 120 and a credential production system 110. This programming is done based on information from an access control database 130. In a typical scenario, remote processing system 105 is maintained by the security department of a company. The security department maintains access control database 130 as a list of all personnel authorized to enter company premises. A personnel may report to the security department and request an appropriate access credential. The access information associated with the person is gathered from access control database 130 and programmed into a blank access credential using access credential production system 110. This programmed access credential can then be used by the person to access one or more of access points 150 through presentation to respective access control devices 140.

Turning to FIG. 1B, a known payment control system 101 is illustrated. System 101 includes a remote processing system 106 and local operation systems 108. Each of operation systems 108 include point of sale devices 141 deployed at a payment location 151, such as, a cash register at a department store. When a payment is to be made, a customer presents a credential at one of point of sale devices 141. In turn, payment information, such as, for example, a credit card number, is received by point of sale device 141 and transmitted to a central payment control 121. This information is validated by central payment control 121 through use of a payment control database 131. In turn, central payment control 121 passes either a payment authorization or declines payment. The transaction is then finished based on the authorization or denial.

Payment information that allows for payment using one or both of point of sale devices 141 is programmed into credentials by a central payment control 121 and a credential production system 111. This programming is done based on information from an payment control database 131. In a typical scenario, remote processing system 106 is maintained by, for example, a credit card company. The company maintains payment control database 131 as a list of all persons authorized to make payments, and limits on such payments. A person desiring to obtain a payment credential contacts the company and requests the credential. In turn, the company verifies the status of the person and authorizes payment limits. The company also produces a payment credential using credential production system 111, and the payment credential is sent to the person. The payment credential can then be presented by the person to point of sale device 141 to finalize a purchase.

Figure 2:
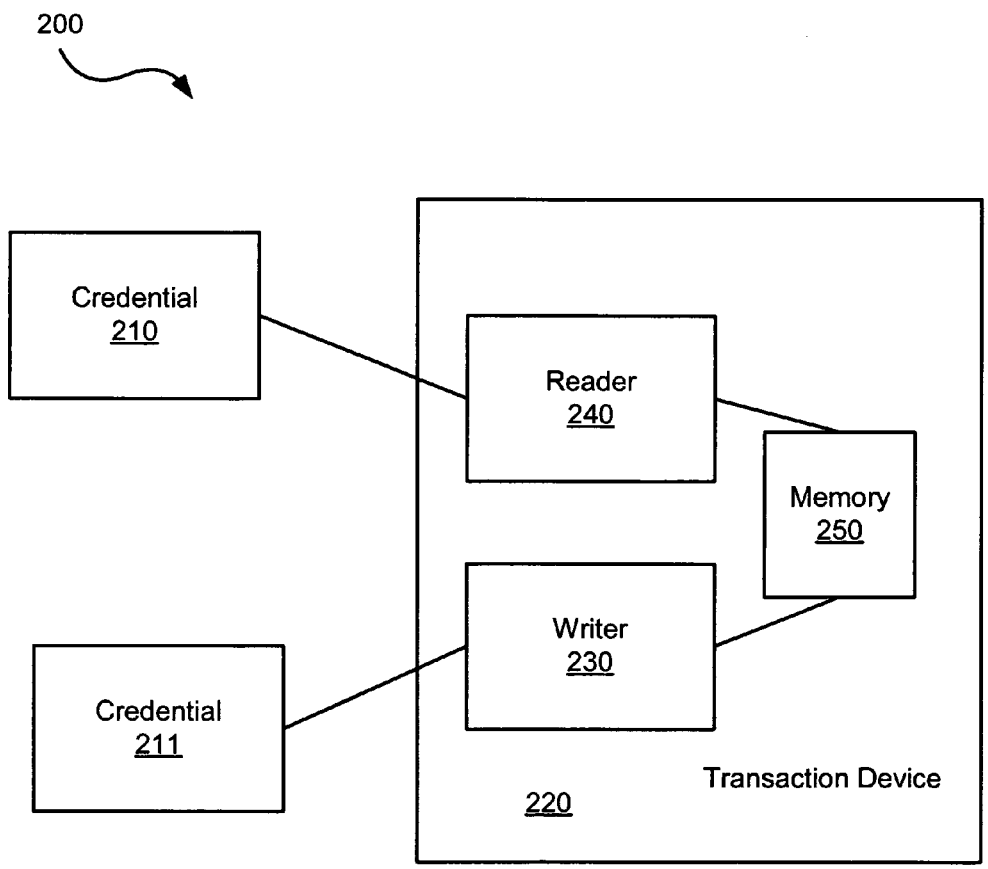
FIG. 2 illustrates an emulation capable transaction system and device in accordance with various embodiments of the present invention.

Turning to FIG. 2, an emulation capable transaction system 200 in accordance with various embodiments of the present invention is illustrated. System 200 includes a readable credential 210 and a readable/writable credential 211. As will be appreciated from the following disclosure, readable disclosure 210 may be in some cases writable as well. System 200 also includes an emulation capable transaction device 220. Emulation capable transaction device 220 includes a reader 240 and a writer 230. Each of reader 230 and writer 240 are communicably coupled to a memory 250. As used herein, the term "communicably coupled" is used in its broadest sense to mean coupling by any mechanism allowing communication of information. Thus, communicably coupled can be, but is not limited to, electrically coupled, optically coupled, audibly coupled, radio frequency coupled, and/or the like.

In operation, credential 210 is presented to transaction device 220. Transaction information is passed from credential 210 to transaction device 220 via reader 240. As will be appreciated by one of ordinary skill in the art, this information can be passed using one of a number of methods and can be passed in a variety of forms. In one particular embodiment of the present invention, credential 210 is a radio frequency identification credential capable of transmitting transaction information via a radio frequency to reader 240. As just some examples, various radio frequency readers are disclosed in U.S. patent application Ser. No. 12/691,726 entitled "Systems and Methods for Access Control", filed by Conlin et al. on a date even herewith. The entirety of the aforementioned application is incorporated herein by reference for all purposes.

In one particular embodiment of the present invention, the transaction information is transferred from credential 210 as a bit stream modulated by a carrier frequency. This bit stream includes a sync code and a command word followed by data. The sync code is used it synchronize to the incoming stream, the command word can indicate the operation being requested such as pay, enter, read, write, or any other command to actuate the transaction device. Based on the disclosure provided herein, one of ordinary skill in the art will recognize a number of sync codes, command words, and/or data packages that may be used in accordance with one or more embodiments of the present invention.

This transaction information is stored to memory 250. In addition, the transaction information may be used to authorize and effectuate a particular transaction. Thus, for example, where transaction device 220 is an access control device, the transaction information can be parsed, and a determination made whether the transaction information is associated with a person authorized to access the access point associated with the transaction device. Where the person is authorized, the access point is opened, otherwise access is denied. As another example, where transaction device is a credit card processing device, the transaction can be parsed, and the payment information gleaned from the credential by reader 240. This payment information can then be transmitted to a credit card processing facility, and in return the credit card processing facility provides either an authorization or denial. Based on the disclosure provided herein, one of ordinary skill in the art will appreciate that transaction device 220 may be one of a number of different transaction device types as are known in the art.

In addition to transaction processing capabilities as described above, transaction device 220 includes emulation capabilities. Such emulation capabilities are implemented using writer 230 to upload transaction information to credential 211. In one particular embodiment, the transaction device writes the credential by issuing a write command via writer 230 that is recognized by credential 211. The write command is followed by program data that is received by credential 211 and stored therein. This program data can then be used to actuate transaction device 220 the next time credential 211 is presented to transaction device 220. Based on the disclosure provided herein, one of ordinary skill in the art will appreciate a number of different ways to write data to credential 211 that would be in accordance with one or more embodiments of the present invention.

Writing the transaction information to credential 211 which is also capable of communicating the transaction information to transaction device 220 creates another credential 211 (i.e., emulates the first credential in the second credential) capable of carrying out transactions enabled thereby. As will be appreciated by one of ordinary skill in the art, providing such emulation capability allows a user with many credentials to combine such credentials into a single credential. As a more particular example, a user with a radio frequency identification access credential, a magnetic stripe payment credential, and a credential enabled cellular phone may be able to access a transaction device capable of reading the payment credential and upload the transaction information therefrom to the cellular phone; and access a transaction device capable of reading the access credential and upload the transaction information therefrom to the cellular phone. As such, the cellular phone is enabled to perform payments similar to that done using the payment credential, and access similar to that done using the access credential. This can be done without visiting a centralized control point (e.g., a credit card processing company or a security department).

Figure 3A:
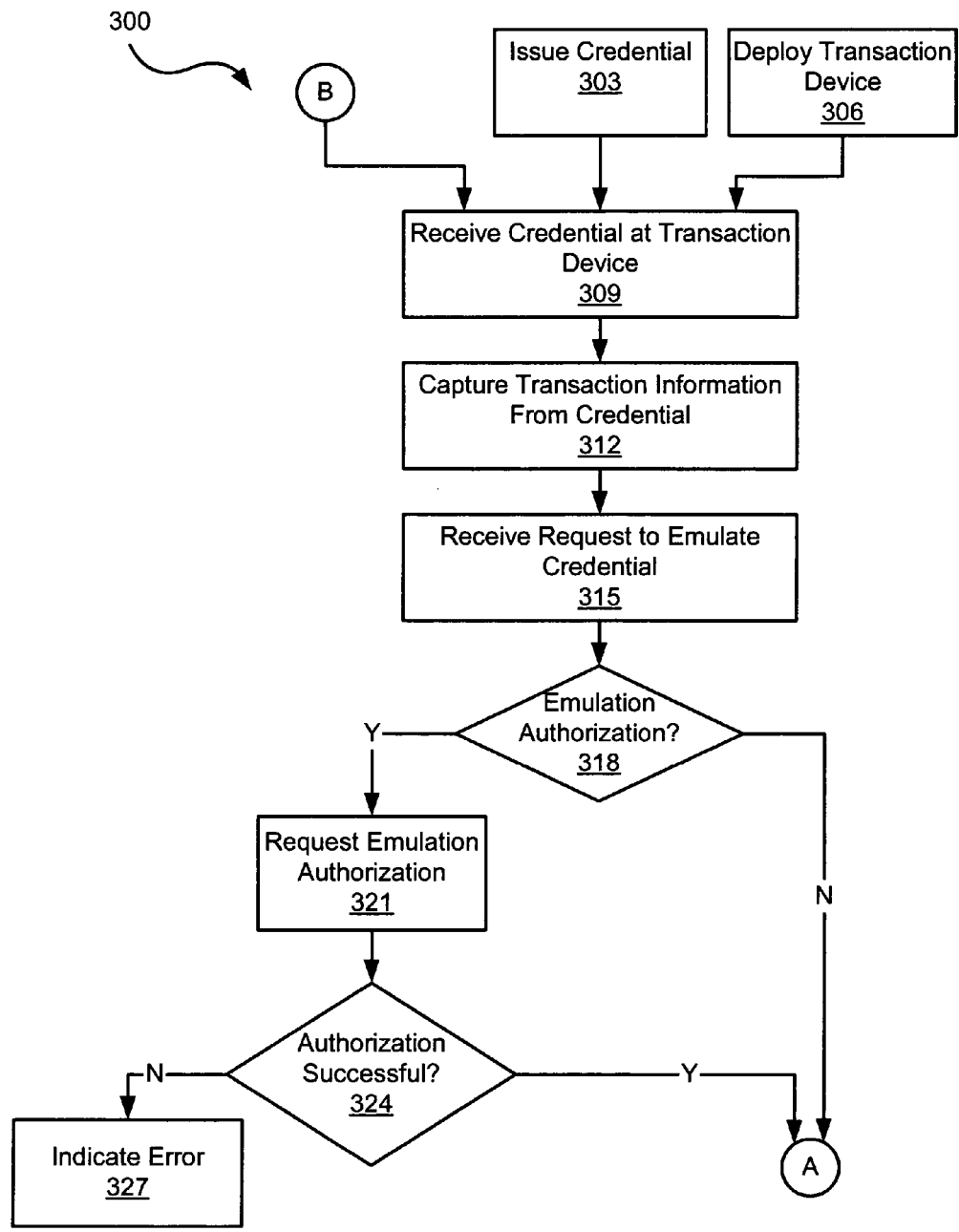
FIG. 3 are flow diagrams illustrating methods for using transaction devices in accordance with one or more embodiments of the present invention.
Figure 3B:
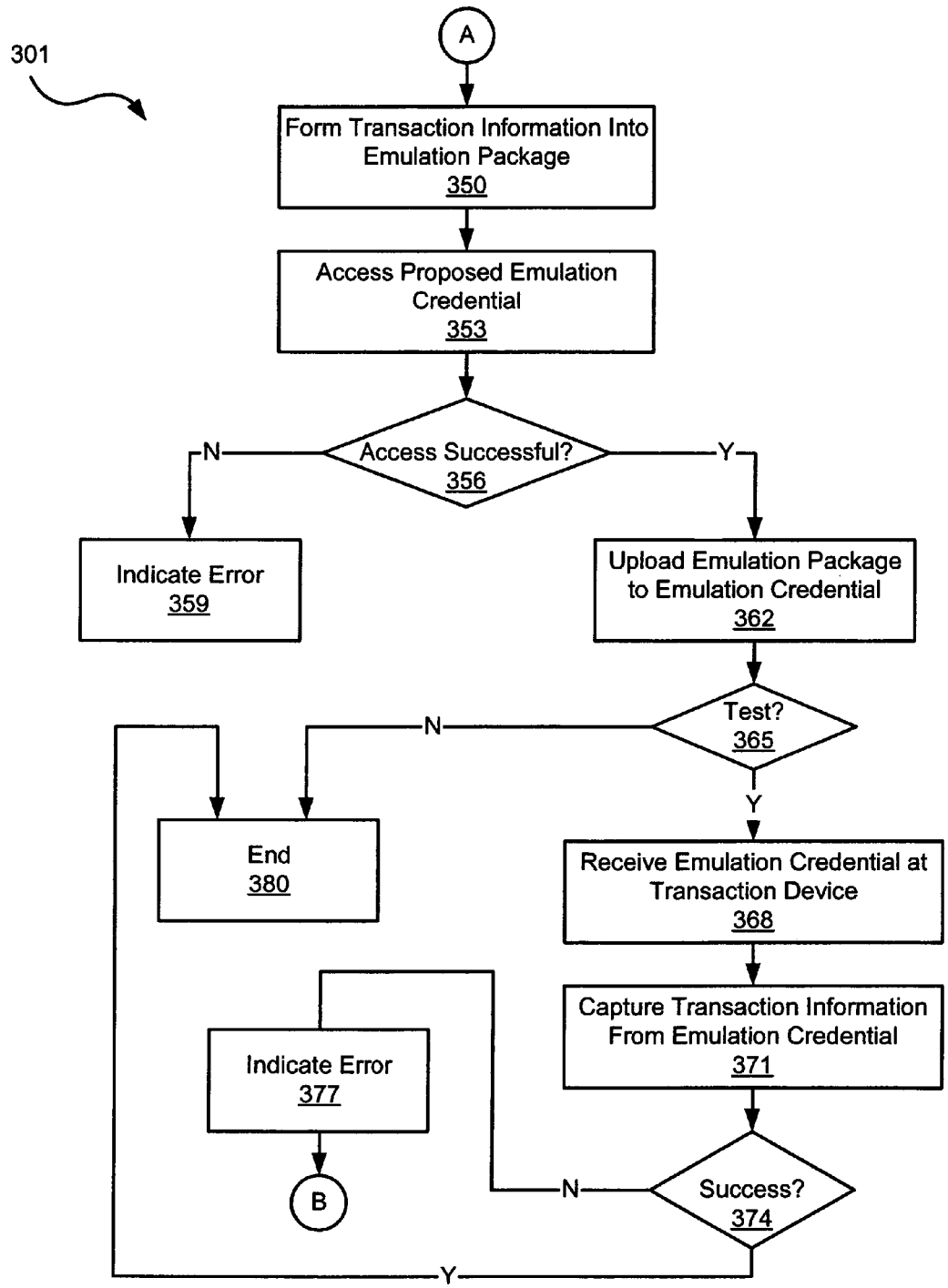

Turning to FIG. 3, flow diagrams 300, 301 illustrate methods for using transaction devices in accordance with one or more embodiments of the present invention. Following flow diagram 300, a credential is issued (block 303), and a transaction device is deployed (block 306). As one example, in an access control system, the credential may be created at a security office of a corporation interested in governing access to one or more of its buildings. In such a case, the transaction device may be deployed near a door or other access point that will be susceptible to the credential. In some cases, deploying the transaction device can include wiring or otherwise coupling the transaction device to a latch or other access control associated with the access point.

As another example, in a point of sale system, the credential may be a credit card or debit card issued by an issuing institution. In such cases, deploying the transaction device may include installing a point of sale device at a location where a purchase may be consummated. In some cases, this may include coupling the point of sale device to a cash register at a retail check out stand. Based on the disclosure provided herein, one of ordinary skill in the art will recognize a variety of other deployment and issuance approaches and/or processes that may be used in accordance with one or more embodiments of the present invention.

Continuing with flow diagram 300, the issued access credential is received at the deployed transaction device (block 309). This may include transmitting information from the credential to the transaction device via a wireless or wired interface. As previously suggested, a wireless interface may be, but is not limited to, an optical interface, a radio frequency interface, a cellular interface, and/or the like. The information transmitted from the credential (block 309) is captured by the transaction device and stored in a memory associated therewith (block 312). In some cases, this information may be sufficient to actuate the transaction device. Thus, for example, this information may be sufficient to trigger the transaction device to at least begin a payment process. As another example, this information may be sufficient to cause an actuator associated with an access point to release and allow entry through the access point. Based on the disclosure provided herein, one of ordinary skill in the art will appreciate a number of other uses for the access information.

In various embodiments of the present invention, a request to emulate the credential is also received at the transaction device (block 315). In some cases, this request may be received by pressing one or more buttons associated with the transaction device. In other cases, this request may be received wirelessly by presenting an emulation credential to the transaction device. In such a case, the presented emulation credential may upload information to the transaction device that indicates authority to emulate the previously presented credential. This indication of authority may include one or more private codes programmed by an owner of the issued credential into the emulation credential. Based on the disclosure provided herein, one of ordinary skill in the art will recognize a variety of methods whereby a desire to create an emulation credential can be communicated to the transaction device.

It is determined whether authorization must first be obtained before creating an emulation credential (block 318). Where authorization is required (block 318), authorization information is requested (block 321) and it is determined if the requested authorization information satisfies any required authorization criteria (block 324). As an example, it may be required that the registered owner of the issued credential be the same as the registered owner of the emulation credential. As another example, a user may be required to enter a personal identification code associated with the issued credential into the transaction device before being allowed to create an emulation credential. Based on the disclosure provided herein, one of ordinary skill in the art will recognize a variety of approaches that can be used for authorizing the creation of an emulation credential. Where the authorization is unsuccessful (block 324), and error code is indicated (block 327).

Alternatively, where the authorization is successful (block 327), or where no authorization is required (block 318), the process proceeds to flow diagram 301 as indicated by the letter "A". Following flow diagram 301, the previously received transaction information is retrieved from memory and formed into an emulation package (block 350). This emulation package includes all information necessary to prepare the emulation credential to act as a proxy for the issued credential. Thus, for example, the emulation package may contain an access code, an indication of one or more carrier frequencies at which associated access readers operate, and any other information related to access a given set of access controllers. A similar package is formed for other transaction devices such as, for example, point of sale devices. The emulation credential is accessed (block 353). This may include, for example, sending one or more messages to the emulation credential and receiving one or more responses therefrom. This process may include, but is not limited to, sending a setup message to the emulation credential that prepares the emulation credential to receive and accept the emulation package. It is then determined if the access to the emulation credential was successful (block 356). Where the access to the emulation credential is not successful (block 356), an error message is indicated (block 359).

Alternatively, where the access to the emulation credential is successful (block 356), the emulation package is uploaded to the emulation credential (block 362). In turn, the emulation credential receives the emulation package, stores the various information from the emulation package, and uses the information to prepare the emulation credential to act as the issued credential. It is determined whether the emulation credential is to be tested (block 365). Where testing of the emulation credential is not requested otherwise indicated (block 365), the process ends (block 380).

Alternatively, where the emulation credential is to be tested (block 365), the emulation credential is received at the transaction device as if a new transaction is being initiated (block 368). This is as if the emulation credential is being presented to the transaction device as the issued credential was in the previously described block 309. The transaction information is captured from the emulation credential (block 371), and it is determined if the emulation credential was properly prepared to act as the issued credential (block 3714). Where the emulation is successful (block 374), the process ends (block 380). Otherwise, an error message is indicated (block 377).

In another embodiment of the present invention, an emulation credential is created as follows. The emulation credential is presented to a transaction device capable of writing credentials. The transaction device reads the emulation credential and determines that it is writable, and that it does not include data or a program sufficient to actuate the transaction device. Either simultaneously or within a timeout period, a credential capable of actuating the transaction device is presented to the transaction device. This sequence causes the transaction device to recognize that the transaction information from the enabled credential is to be written to the emulation credential. As such, the transaction device is not actuated to perform the standard function assigned to the transaction device, but rather, the transaction device looks again (sends and receives information to/from) the emulation credential. In some cases, the transaction device is querying to determine if it is the same emulation credential that it previously recognized. Once found, the transaction device begins to upload the transaction information derived from the enabled credential to the emulation credential. This may be done, for example, by sending a write command/message followed by the appropriate transaction information received from the enabled credential. The emulation credential receives and stores the incoming information. At such time, the emulation credential is enabled to actuate the transaction device.

Figure 4:
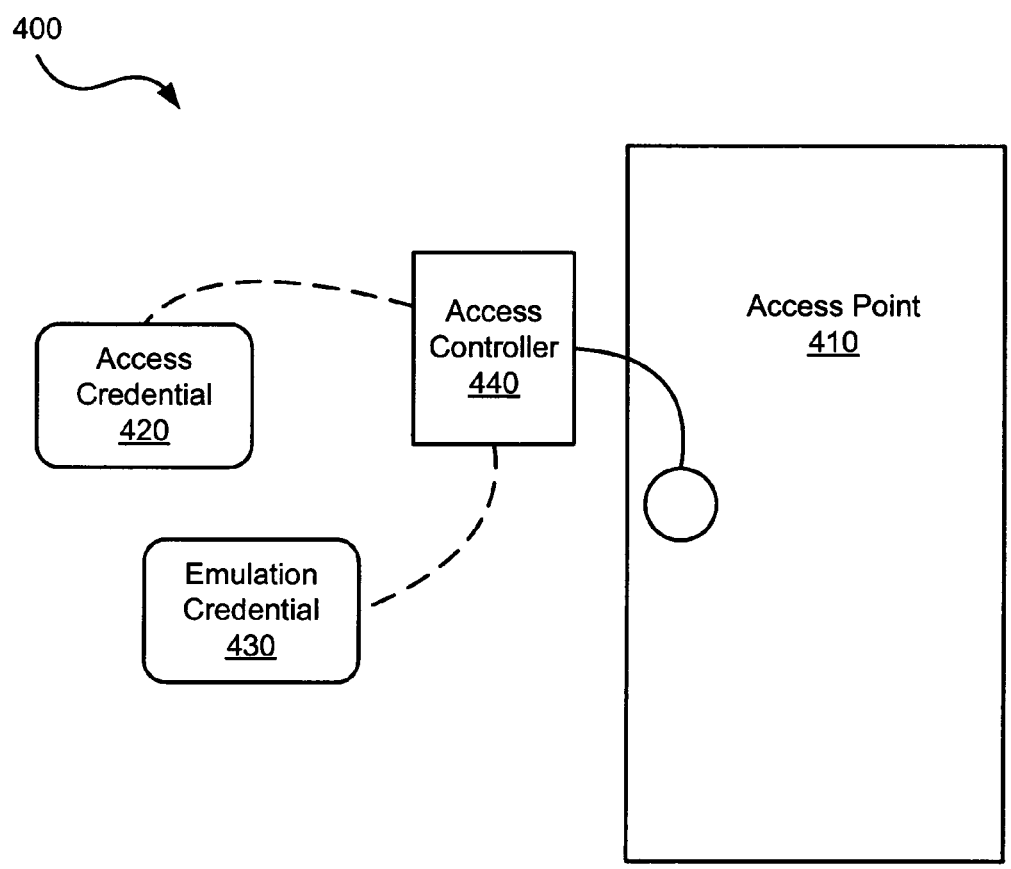
FIG. 4 depicts an emulation system with the transaction device capable of emulation being deployed local to an access point in accordance with various embodiments of the present invention.

Turning now to FIG. 4, a particular embodiment of the present invention showing an emulation system 400 embodied as an access control system in accordance ton one or more embodiments of the present invention is depicted. Emulation system 400 includes an access controller 440, an emulation credential 430, and an access credential 420. Access controller 440 is communicably coupled to a latch associated with an access point 410. In operation, access credential 420 is presented at access controller 440. This may be sufficient to actuate the latch associated with access point 410. In addition, a request to form an emulation credential may be received. Where such is the case, access controller 440 uploads information to emulation credential 430 such that emulation credential 430 becomes capable actuating access controller 440 similar to that of access credential 430.

From this point, access controller 440 may be actuated by either of access credential 420 or emulation credential 430. In one particular case, upon successful creation of emulation credential 430, access credential 420 is disabled by a message written to access controller 440 to access credential 420. In such cases, only one credential is ever left to actuate access controller 440. This may be advantageous where additional security is desired through limiting the proliferation of credentials capable of accessing transaction devices.

One of ordinary skill in the art will appreciate that while system 400 is specific to an access control application, similar principles and approaches can be applied to systems using other types of transaction devices. Such other transaction devices may be, but are not limited to, point of sale devices.

Based on the disclosure provided herein, one of ordinary skill in the art will appreciate a number of advantages associated with one or more embodiments of the present invention. For example, some embodiments of the present invention provide systems and/or methods whereby a number of credentials can be emulated by a single "universal" credential this eliminates the need for a user to carry a multiplicity of credentials. Further, one or more embodiments of the present invention provide systems and/or methods whereby a credential issuer may issue "temporary" credentials with the expectations that such credentials will be used to upload information to an emulation credential. Based on the disclosure provided herein, one of ordinary skill in the art will recognize a number of other advantages associated with one or more of the inventive systems and methods disclosed herein.

Figure 5:
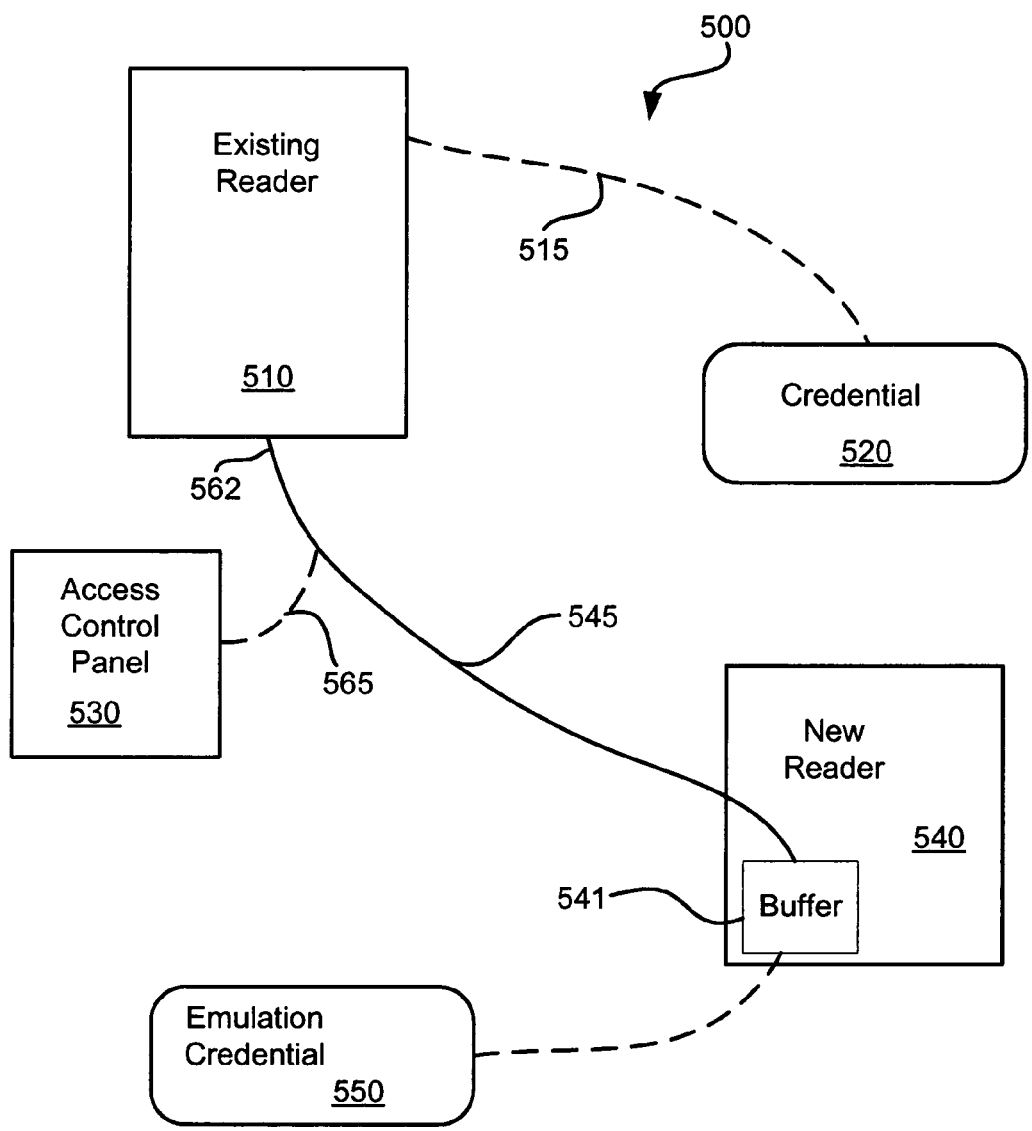
FIG. 5 depicts a dual reader credential emulation system in accordance with one or more embodiments of the present invention.

Turning to FIG. 5, a dual reader credential emulation system 500 in accordance with one or more embodiments of the present invention is depicted. Dual reader credential emulation system 500 includes an existing reader 510 that is capable of receiving information from a credential 520 via a communication link 515. Communication link 515 is shown with a dashed line indicating a wireless communication link, but one of ordinary skill in the art will recognize a variety of communication links that may be used including wireless links such as RF links and optical links, as well as physical communication links such as optical fiber and copper wire links. Existing reader 515 may be a known access control reader that is capable of receiving information from an access control credential, and using that information to determine whether access is authorized. Based on the disclosure provided herein, one of ordinary skill in the art will recognize a variety of devices that can perform the functions of existing reader 510.

For example, existing reader 510 may be an access control device 140 or a point of sale device 141. In some cases, as indicated by dashed line 565, existing reader 510 is communicably coupled to an access control panel 530 via a communication port 567 of existing reader 510. As just one example, access control panel may be central access control 120 or central payment control 121. In general, access control panel 530 provides a remote, centralized, and/or hierarchical control for one or more existing readers. Based on the disclosure provided herein, one of ordinary skill in the art will recognize a variety of devices and/or systems that may perform the function of access control panel 530.

Dual reader credential emulation system 500 also includes a new reader 540 with a buffer 541. New reader 540 is communicably coupled to existing reader 545 via a communication link 545. In one particular case, communication link 545 is a copper wire, but one of ordinary skill in the art will recognize a variety of communication links that may connect existing reader 510 to new reader 540. New reader 540 is also communicably coupled to an emulation credential 550 via a communication link 555. In one particular case, communication link 555 is a wireless link, but one of ordinary skill in the art will recognize a variety of communication links that may connect new reader 540 to emulation credential 550.

Figure 6:
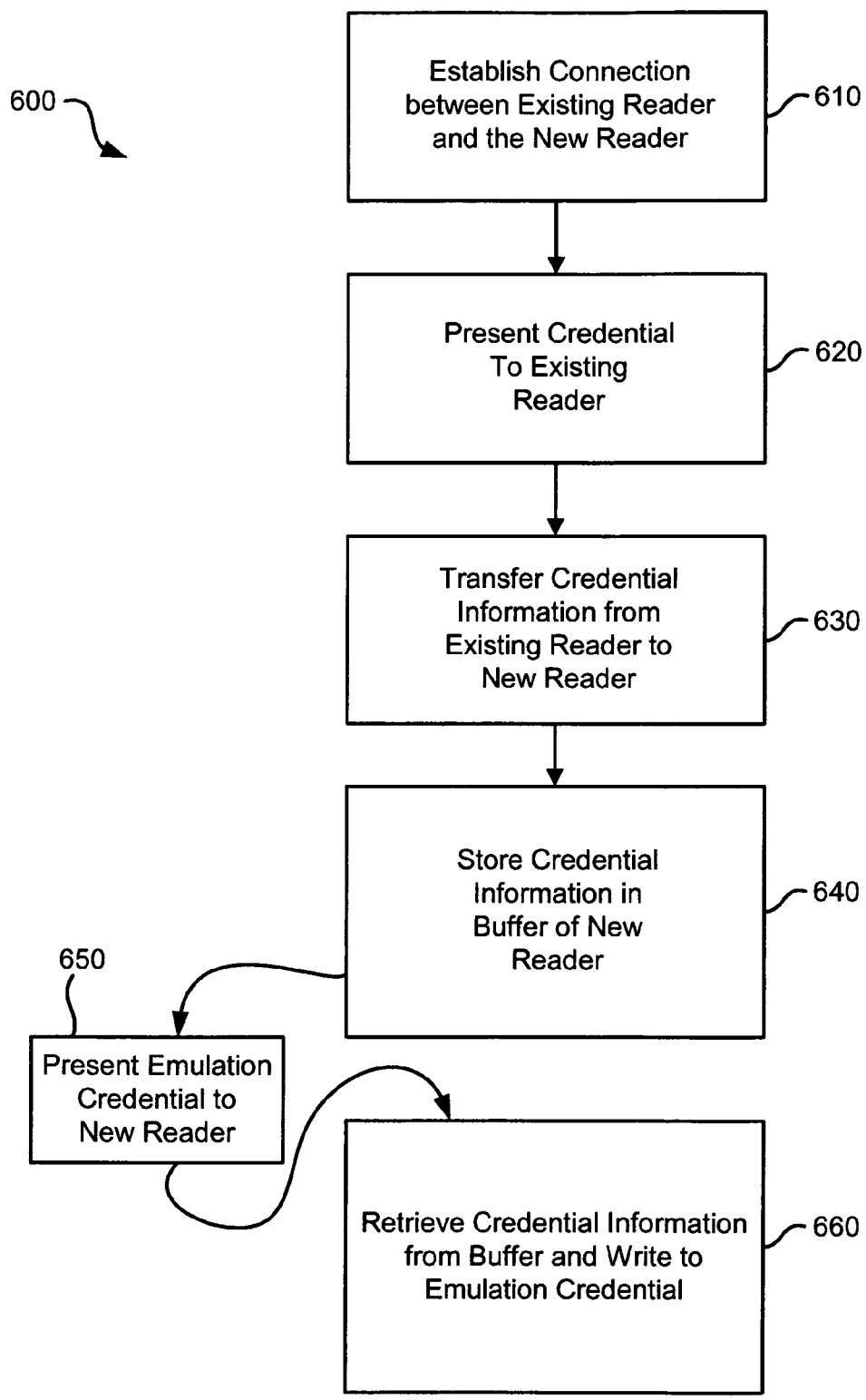
FIG. 6 is a flow diagram illustrating a method for credential emulation using a dual reader system in accordance with some embodiments of the present invention.

Turning to FIG. 6, a flow diagram 600 illustrates a method for credential emulation using a dual reader system in accordance with some embodiments of the present invention. Following flow diagram 600, a connection is established between existing reader 510 and new reader 540 (block 610). In some cases, this can include connecting the two readers using a wire. In other cases, a different communication link between the two readers is implemented. A credential is presented to the existing reader (block 620). In some cases, this includes moving an access control card within a perimeter of the reader. In other cases, this can include swiping a magnetic stripe card through the reader. Based on the disclosure provided herein one of ordinary skill in the art will recognize a variety of ways in which a credential may be presented to the existing reader.

With the connection established, information is transferred from credential 520 to existing reader 510. This information may be, as just one example, information identifying a holder of the credential that may be intended to authorize access via an access point. Based on the disclosure provided herein, one of ordinary skill in the art will recognize a variety of information that may be transferred. All or some part of the information received by existing reader 510 from credential 520 is transferred to new reader 540 (block 630). In some cases, the new reader may not include capability for directly receiving information from the credential, while in other cases it may. The information received from existing reader 510 is stored in buffer 541 associated with the new reader (block 640). Emulation credential 550 is presented to new reader 510 (block 650), and the information stored in buffer 541 is written to emulation credential 550 (block 660). In this way, emulation credential 550 is modified to operate in a fashion similar to the credential presented to existing reader 510. For example, where credential 520 is an access credential, emulation credential 550 may provide for access similar to that of credential 520. In some cases, credential 520 may perform multiple functions, and credential 550 may be modified to perform one or more of the multiple functions. In some cases, credential 520 may perform a single function, and credential 550 may be modified to perform the single function in addition to other functions emulated from other credentials. Based on the disclosure provided herein, one of ordinary skill in the art will recognize a number of combinations of functions that may be emulated using the methods described in relation to FIG. 6.

Based on the disclosure provided herein, one of ordinary skill in the art will recognize a variety of setups and/or implementations that may achieve the functionality described in relation to FIG. 5 and FIG. 6. For example, in many cases a connection to an access panel is unnecessary. Further, in some cases, it may be desirable to mount both existing reader 510 and new reader 540 on a common backplate, table or cart. This may provide a convenient system and/or location for performing credential emulation. As such, one of ordinary skill in the art will recognize that the terms "existing reader" and "new reader" merely indicate a differentiation between two readers and do not necessarily connote that one reader was previously installed and that another reader is being introduced. Rather, both readers may be installed on a cart or other location together. Thus, the term existing reader connotes a reader able to receive information from a particular credential, and the term new reader connotes a reader able to write information to an emulation credential. In some cases, an existing reader and a new reader may have identical functionality, while in other cases, the functionality may be different.

In one particular embodiment, existing reader 510 is an older model reader that does not include emulation technology. Existing reader 510 is mounted on a cart with a newer model reader 540 that does have emulation capability. A wiegand output (or serial or other data type) from existing reader 510 is provided to reader 540. Such would allow presentation of a prox (or other technology) card to existing reader 510, and capture of the prox wiegand (or other) data by newer model reader 540. Newer model reader 540 would then be able to write the captured data to an emulation credential. In one specific case, existing reader 510 is a reader made by HID Inc., and new reader 540 is made by XCEEDID.

Figure 7:
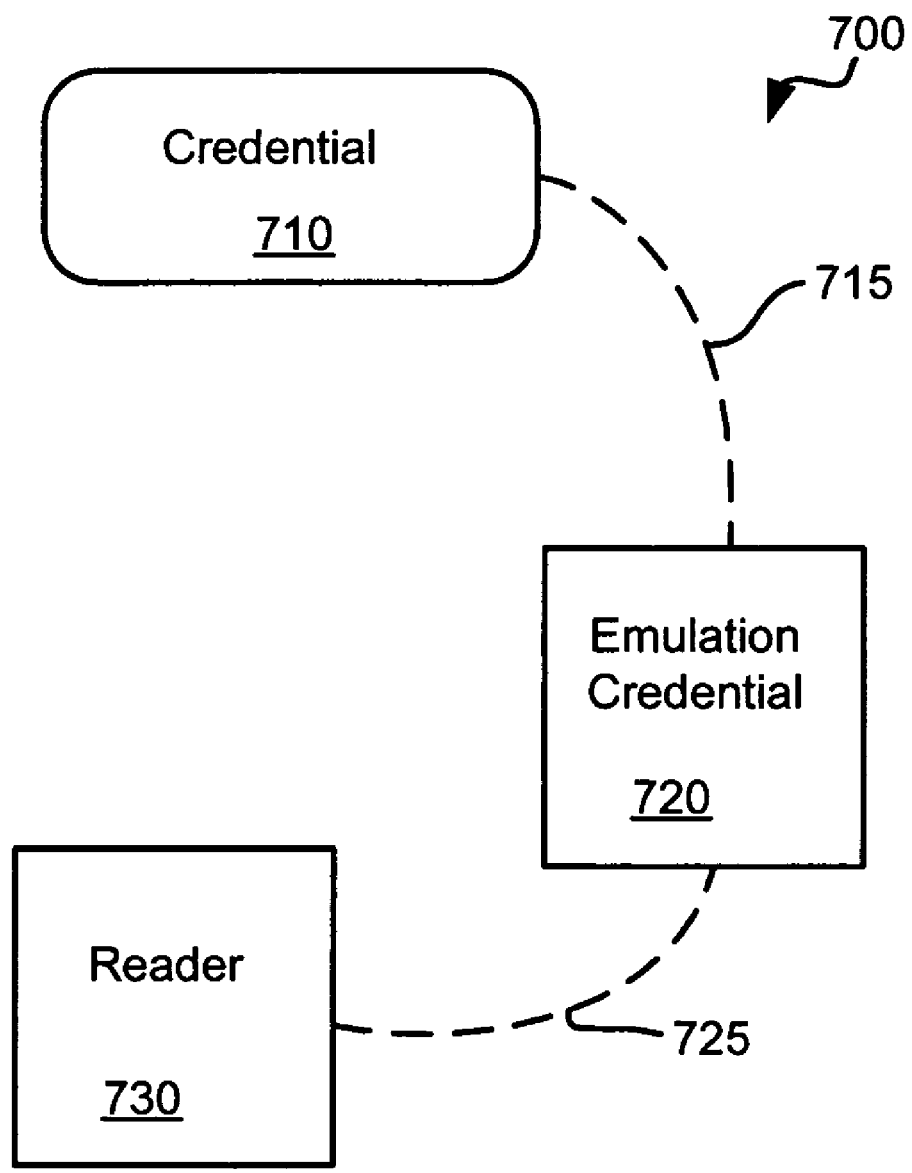
FIG. 7 shows a system able to create an emulation credential without an intervening reader in accordance with one or more embodiments of the present invention.

Turning to FIG. 7, a system 700 is able to create an emulation credential without an intervening reader in accordance with one or more embodiments of the present invention. System 700 includes a credential 710 that is communicably coupled to an emulation credential 720 via a communication link 715. In one particular case, emulation credential 720 is a cell phone, but one of ordinary skill in the art will recognize other types of credentials. Emulation credential 720 includes at least some of the functionality of previously described readers, and is thus able to receive information from credential 710. This received information can be saved in emulation credential 720, and used later to communicate with a reader 730 via a communication link 725. Reader 730 can be, but is not limited to, an access control reader or a point of sale device. The preparation and use of the emulation credential is similar to that described above.

In conclusion, the present invention provides novel systems, devices, methods and arrangements for facilitating credential emulation. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for credential emulation, the method comprising:
providing a first transaction device and a second transaction device, wherein the first transaction device includes a first reader function operable to authorize credential information, and wherein the second transaction device includes a second reader function operable to authorize credential information;
receiving information from a first credential at the first transaction device;
providing at least a portion of the information received from the first credential to the second transaction device; and
providing at least the portion of the information from the second transaction device to a second credential.

2. The method of claim 1, wherein the first transaction device is operable to communicate with an access control panel via a communication interface, and wherein the method further comprises:
terminating communication between the first transaction device and the access control panel; and connecting the second transaction device to the communication interface.

3. The method of claim 1, wherein at least one of the first transaction device and the second transaction device is selected from a group consisting of: a point of sale device and an access control device.

4. The method of claim 1, wherein the first credential is selected from a group consisting of: a smart card, a magnetic stripe card, a cell phone and a personal digital assistant.

5. The method of claim 4, wherein the second credential is selected from a group consisting of: a smart card, a magnetic stripe card, a cell phone and a personal digital assistant.

6. The method of claim 1, wherein the first credential is communicably coupled to the first transaction device via an interface selected from the group consisting of: a magnetic stripe interface, a radio frequency interface, an optical interface, and a wired interface.

7. The method of claim 1, wherein receiving the information by the first transaction device from the first credential is done at a first carrier frequency, and wherein providing at least the portion of the information from the second transaction device to the second credential is done at a second carrier frequency.

* * * * *